(12) United States Patent
Abe et al.

(10) Patent No.: US 10,811,674 B2
(45) Date of Patent: Oct. 20, 2020

(54) NON-AQUEOUS ELECTROLYTE ELECTRICITY-STORAGE ELEMENT INCLUDING POSITIVE ELECTRODE HAVING CARBONACEOUS MATERIAL WITH FLUORINE ON SURFACE

(71) Applicants: Naoto Abe, Shizuoka (JP); Yoshio Itoh, Shizuoka (JP); Tatsuya Dan, Shizuoka (JP); Yuka Araki, Shizuoka (JP); Shuhei Takeshita, Shizuoka (JP)

(72) Inventors: Naoto Abe, Shizuoka (JP); Yoshio Itoh, Shizuoka (JP); Tatsuya Dan, Shizuoka (JP); Yuka Araki, Shizuoka (JP); Shuhei Takeshita, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 147 days.

(21) Appl. No.: 15/677,237

(22) Filed: Aug. 15, 2017

(65) Prior Publication Data
US 2017/0346072 A1    Nov. 30, 2017

Related U.S. Application Data

(63) Continuation of application No. PCT/JP2016/053181, filed on Feb. 3, 2016.

(30) Foreign Application Priority Data

Feb. 19, 2015   (JP) .................................. 2015-030581
Jul. 28, 2015   (JP) .................................. 2015-148869

(51) Int. Cl.
*H01M 4/133*     (2010.01)
*H01M 10/052*    (2010.01)
(Continued)

(52) U.S. Cl.
CPC ........... *H01M 4/133* (2013.01); *H01M 4/485* (2013.01); *H01M 4/583* (2013.01);
(Continued)

(58) Field of Classification Search
CPC ...... H01M 4/133; H01M 4/485; H01M 4/583; H01M 4/5835; H01M 10/052; H01M 10/0568; H01M 10/0569
(Continued)

(56) References Cited

U.S. PATENT DOCUMENTS

2003/0143457 A1   7/2003   Kashino et al.
2006/0269834 A1   11/2006  West et al.
(Continued)

FOREIGN PATENT DOCUMENTS

CN   100999318 A   7/2007
CN   101276942 A   10/2008
(Continued)

OTHER PUBLICATIONS

Nakajima et al., Surface structure and electrochemical properties of surface-fluorinated petroleum cokes for lithium ion battery, Apr. 2004, Journal of Power Sources, 133, 243-251 (Year: 2004).*
(Continued)

*Primary Examiner* — Sean P Cullen
(74) *Attorney, Agent, or Firm* — Oblon, McClelland, Maier & Neustadt, L.L.P.

(57) ABSTRACT

A non-aqueous electrolyte electricity-storage element which includes a positive electrode including a positive-electrode active material capable of inserting and releasing anions, a negative electrode including a negative-electrode active material, and a non-aqueous electrolyte, wherein the positive-electrode active material is formed of a carbonaceous material, and a surface of the carbonaceous material includes fluorine.

12 Claims, 5 Drawing Sheets

(51) Int. Cl.
*H01M 10/0568* (2010.01)
*H01M 10/0569* (2010.01)
*H01M 4/583* (2010.01)
*H01M 4/485* (2010.01)
*H01M 4/02* (2006.01)

(52) U.S. Cl.
CPC ....... *H01M 4/5835* (2013.01); *H01M 10/052* (2013.01); *H01M 10/0568* (2013.01); *H01M 10/0569* (2013.01); H01M 2004/028 (2013.01); H01M 2220/20 (2013.01); Y02E 60/122 (2013.01); Y02T 10/7011 (2013.01)

(58) Field of Classification Search
USPC ......... 429/188, 231.7, 231.8, 231.96, 231.95
See application file for complete search history.

(56) References Cited

U.S. PATENT DOCUMENTS

| | | | | |
|---|---|---|---|---|
| 2007/0077493 A1* | 4/2007 | Yazami | ................. | H01M 4/133 429/231.7 |
| 2007/0077495 A1* | 4/2007 | Yazami | ................. | H01M 4/133 429/322 |
| 2007/0231696 A1* | 10/2007 | Yazami | ................. | B82Y 30/00 429/231.7 |
| 2008/0241687 A1* | 10/2008 | Ishii | ................. | B60L 50/64 429/218.1 |
| 2010/0069507 A1* | 3/2010 | Tabata | ................. | B01J 20/20 514/769 |
| 2010/0203390 A1* | 8/2010 | Takamura | ................. | H01M 4/40 429/231.8 |
| 2010/0310908 A1* | 12/2010 | Zhang | ................. | H01M 4/364 429/90 |
| 2012/0064412 A1* | 3/2012 | Tahara | ................. | H01M 4/06 429/231.7 |
| 2012/0077089 A1 | 3/2012 | Sakata et al. | | |
| 2012/0234695 A1* | 9/2012 | Mayes | ................. | C01B 32/20 205/758 |
| 2013/0330504 A1* | 12/2013 | Morishita | ............. | C01B 32/348 428/116 |
| 2014/0027677 A1* | 1/2014 | Lipka | ................. | H01B 1/24 252/502 |
| 2014/0030559 A1 | 1/2014 | Yazami et al. | | |
| 2014/0170507 A1 | 6/2014 | Matsui et al. | | |
| 2014/0178750 A1* | 6/2014 | Anji Reddy | ............ | H01M 4/04 429/188 |
| 2014/0186696 A1 | 7/2014 | Onagi et al. | | |
| 2014/0234709 A1* | 8/2014 | Bernard | ................. | H01M 4/06 429/217 |
| 2015/0162138 A1* | 6/2015 | Shodai | ................. | H01G 11/24 361/502 |
| 2015/0287537 A1 | 10/2015 | Onagi et al. | | |
| 2016/0133932 A1* | 5/2016 | Liang | ................. | H01M 4/5835 429/231.7 |

FOREIGN PATENT DOCUMENTS

| | | | |
|---|---|---|---|
| JP | 08-031404 | 2/1996 | |
| JP | 2008-543002 | 11/2008 | |
| JP | 4569126 | 8/2010 | |
| JP | 2012-094503 | 5/2012 | |
| JP | 2013-058442 | 3/2013 | |
| JP | 2013-065534 | 4/2013 | |
| JP | 2014-096528 | 5/2014 | |
| JP | 2014-112524 | 6/2014 | |
| WO | WO02/017428 A1 | 2/2002 | |
| WO | WO2013/157187 A1 | 10/2013 | |
| WO | WO-2014024921 A1 * | 2/2014 | ............ H01G 9/035 |
| WO | WO 2014/073712 A1 | 5/2014 | |

OTHER PUBLICATIONS

Nakajima et al., Electrochemical properties and structures of surface-fluorinated graphite for the lithium ion secondary battery, 2002, Journal of Fluorine Chemistry, 114, 209-214 (Year: 2002).*

Gupta et al., Electrochemical characteristics and structures of surface-fluorinated graphites with different particle sizes for lithium ion secondary batteries, 2001, Journal of Fluorine Chemistry, 112, 233-240 (Year: 2001).*

Achiha et al., Electrochemical Behavior of Surface-Fluorinated Natural Graphite in Propylene Carbonate-Containing Solvent, Jun. 2007, Journal of the Electrochemical Society, 154, A827-A833 (Year: 2007).*

Nakajima et al., Electrochemical behavior of surface-fluorinated graphite, 1999, Electrochimica Acta, 44, 2879-2888 (Year: 1999).*

Jung et al., Fluorination effect of activated carbon electrodes on the electrochemical performance of electric double layer capacitors, Jul. 2011, Journal of Fluorine Chemistry, 132, 1127-1133 (Year: 2011).*

Extended European Search Report dated Oct. 25, 2017, issued in corresponding European Application No. 16 75 2290, (9 pages).

International Search Report dated Apr. 26, 2016 for counterpart International Patent Application No. PCT/JP2016/053181 filed Feb. 3, 2016 (with English Translation).

Written Opinion dated Apr. 26, 2016 for counterpart International Patent Application No. PCT/JP2016/053181 filed Feb. 3, 2016.

Combined Chinese Office Action and Search Report dated Apr. 3, 2020 in Chinese Patent Application No. 201680010923.2 (with English translation), 20 pages.

* cited by examiner

NON-AQUEOUS ELECTROLYTE ELECTRICITY-STORAGE ELEMENT INCLUDING POSITIVE ELECTRODE HAVING CARBONACEOUS MATERIAL WITH FLUORINE ON SURFACE

CROSS-REFERENCE TO RELATED APPLICATIONS

The present application is a continuation application of International Application No. PCT/JP2016/053181, filed Feb. 3, 2016, which claims priority to Japanese Patent Application No. 2015-148869, filed Jul. 28, 2015 and Japanese Patent Application No. 2015-030581, filed Feb. 19, 2015. The contents of these applications are incorporated herein by reference in their entirety.

BACKGROUND OF THE INVENTION

Field of the Invention

The present disclosure relates to a non-aqueous electrolyte electricity-storage element.

Description of the Related Art

In recent years, properties of non-aqueous electrolyte electricity-storage elements having high energy densities have been improved and the non-aqueous electrolyte electricity-storage elements have been widely used along with reduction in sizes and improvements in performances of mobile devices. Moreover, developments of non-aqueous electrolyte electricity-storage elements having the larger capacities and having excellent safety have been conducted and it has been started that the above-described non-aqueous electrolyte electricity-storage elements are mounted in electric cars.

Moreover, as an electricity-storage element having a high energy density and suitable for high-speed charges and discharges, various proposals have been made on a so-called dual intercalation non-aqueous electrolyte electricity-storage element, which uses a conductive polymer, a carbon material, etc., for a positive electrode, and further includes a negative electrode of carbon etc., and a non-aqueous electrolyte formed by dissolving a lithium salt in a non-aqueous solvent. At the time of charging the dual intercalation non-aqueous electrolyte electricity-storage element, anions in the non-aqueous electrolyte are inserted in the positive electrode and cations in the non-aqueous electrolyte are inserted in the negative electrode, and at the time of discharging the anions inserted in the positive electrode and the cations inserted in the negative electrode are released into the electrolyte, to thereby perform charges and discharges (see, for example, Japanese Unexamined Patent Application Publication No. 2013-058442 and Japanese Unexamined Patent Application Publication No. 2014-112524).

A discharge capacity of a dual carbon electricity-storage element as the dual intercalation non-aqueous electrolyte electricity-storage element is determined by an amount of anions accumulated in a positive electrode, an amount of anions releasable from the positive electrode, an amount of cations accumulated in a negative electrode, an amount of cations releasable from the negative electrode, and an amount of anions and an amount of cations in a non-aqueous electrolyte. In order to increase a discharge capacity of the dual carbon electricity-storage element, therefore, it is necessary to increase an amount of a non-aqueous electrolyte including a lithium salt, as well as a positive-electrode active material and negative-electrode active material (see, for example, Japanese Patent No. 4569126).

However, an amount of electricity the dual carbon element has is proportional to a total amount of anions and cations in a non-aqueous electrolyte. Accordingly, the energy stored in the electricity-storage element is proportional to a total of a mass of the non-aqueous element in addition to a mass of the positive-electrode active material and a mass of the negative-electrode active material. Therefore, it is difficult to increase a weight energy density of the electricity-storage element. When a non-aqueous electrolyte having a lithium salt concentration of about 1 mol/L that is typically used for a lithium ion secondary cell is used, a large amount of the non-aqueous electrolyte is required compared to the lithium ion secondary cell. When a non-aqueous electrolyte having a high lithium salt concentration, i.e., about 3 mol/L, is used, there is a problem that reduction in a capacity of the electricity-storage element over repetitive charges and discharges is large.

An operating voltage of the dual carbon electricity-storage element is about 2.5 V through about 5.4 V, and the maximum voltage is higher than the maximum voltage of a lithium ion secondary cell that is about 4.2 V by about 1 V. Therefore, the non-aqueous electrolyte tends to be decomposed. When the non-aqueous electrolyte is decomposed, deteriorations of the electricity-storage element are caused, such as reduction in a capacity, due to generation of gas or formation of an excessive coating film of fluoride on a surface of a negative electrode. Therefore, a countermeasure for fluoride generated by decomposition of the non-aqueous electrolyte is required.

When a highly graphitized artificial black lead or natural lead material is used as a positive-electrode active material, moreover, black lead crystals are destroyed because hexagonal network planes constituting the black lead crystal are laminated and held only with the weak van der Waals force, and therefore the hexagonal network planes are easily cleaved when anions having a molecular size larger than a distance between the hexagonal network planes are accumulated. When charges and discharges of the electricity-storage element are repeatedly performed in such a state, there is a problem that a capable capacity of reversible accumulation and release of anions is significantly reduced.

SUMMARY OF THE INVENTION

According to one aspect of the present disclosure, a non-aqueous electrolyte electricity-storage element includes a positive electrode including a positive-electrode active material capable of inserting and releasing anions, a negative electrode including a negative-electrode active material, and a non-aqueous electrolyte. The positive-electrode active material is formed of a carbonaceous material. A surface of the carbonaceous material includes fluorine.

DESCRIPTION OF THE EMBODIMENTS

Figure 1:
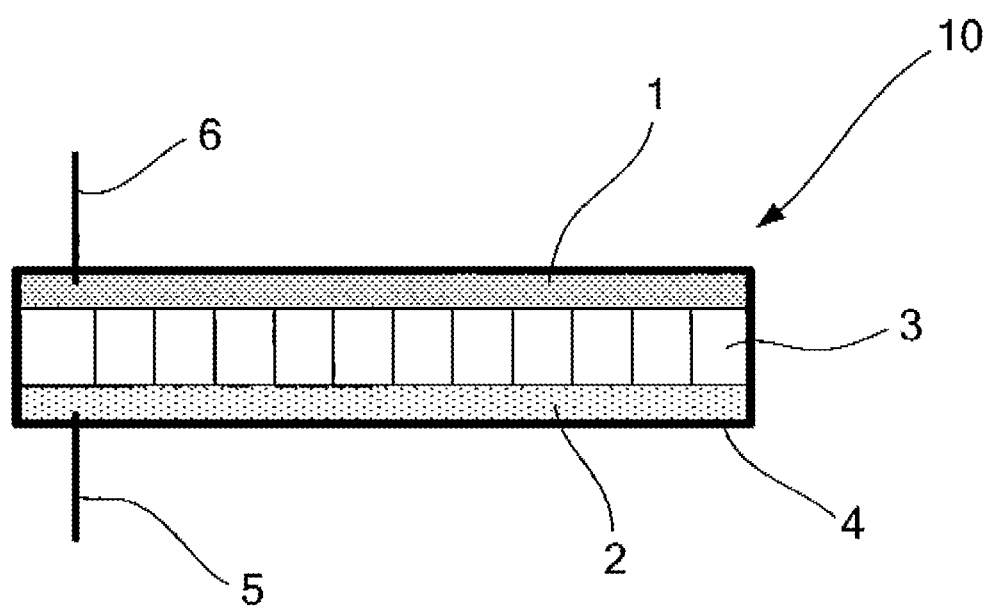
FIG. 1 is a schematic view illustrating one example of a non-aqueous electrolyte electricity-storage element of the present disclosure.

The present disclosure has an object to provide a non-aqueous electrolyte electricity-storage element having a high capacity, excellent cycling properties, and excellent high current discharge properties.

According to the present disclosure, a non-aqueous electrolyte electricity-storage element having a high capacity, excellent cycling properties, and excellent high current discharge properties can be provided.
(Non-Aqueous Electrolyte Electricity-Storage Element)

A non-aqueous electrolyte electricity-storage element of the present disclosure includes a positive electrode, a negative electrode, and a non-aqueous electrolyte, and may further include other members according to the necessity.

In order to solve the above-described problems, the present inventors have diligently conducted researches on a mechanism of that a storage capacity of a non-aqueous electrolyte electricity-storage element using, as a positive electrode, a type of an electrode in which anions are accumulated is reduced when a concentration of an electrolyte salt is high and when high voltage is applied. As a result, the present inventors have found that the reduction in the storage capacity is influenced by anions including halogen atoms, such as fluorine, generated due to decomposition of an electrolyte salt including halogen atoms, such as fluorine, and the decomposition of the electrolyte salt is influenced by a surface state or a functional group of a carbonaceous material that is a positive-electrode active material.

As described above, moreover, it has been known that carbon crystals are destroyed when anions are electrochemically accumulated in a non-aqueous electrolyte electricity-storage element using, as a positive electrode, a type of an electrode in which anions are stored, and therefore a capacity of reversible accumulation and release of anions is reduced by repeatedly performing charges and discharges.

Therefore, the present inventors have further continued researches based on the findings above. As a result, the present inventors have found that reduction in a charge-discharge efficiency when high voltage is applied, a reduction in a capacity, and deteriorations of cycle properties can be prevented by that fluorine that is a low reactive material is included in a surface of a carbonaceous material that is a positive-electrode active material, preferably the carbonaceous material includes carbon surface-modified with fluorine or a fluorocompound in a non-aqueous electrolyte electricity-storage element using, as a positive electrode, a type of an electrode in which anions are accumulated, even when an electrolyte having a high electrolyte salt concentration is used.

In this case, it is also considered that a surface of the carbonaceous material is covered with a fluorine coating, but it is assumed that an effect cannot be obtained because the formed fluorocoating on the surface of the carbonaceous material itself is destroyed by destruction of carbon crystals due to accumulation of anions.

On the other hand, it is assumed that the surface modification of the carbonaceous material with fluorine or a fluorocompound can correspond to swelling and contraction of carbon when anions are accumulated and released, and therefore cycle properties are improved. Since it is surface modification of the carbonaceous material with fluorine or a fluorocompound, moreover, it is assumed that reduction in a charge-discharge capacity can be prevented because edge surfaces of the carbonaceous material that are areas into and from which anions are accumulated and released are not blocked.

Accordingly, a non-aqueous electrolyte electricity-storage element of the present disclosure includes fluorine in a surface of a carbonaceous material that is a positive-electrode active material, and the carbonaceous material preferably includes carbon surface-modified with fluorine or a fluorocompound.

A raw material, production method, or other properties of a carbonaceous material as the positive-electrode active material is not particularly limited and may be appropriately selected depending on the intended purpose. The details of the raw material, production method, and other properties will be described later.

Fluorine (fluorine or a fluorocompound) present in a surface of the carbonaceous material is not particularly limited and may be appropriately selected depending on the intended purpose. Examples of the fluorine include a state of fluorine where the fluorine is bonded to a carbon atom present at a surface of carbon, and a state of fluorine where the fluorine is bonded to another atom.

Examples of the fluorocompound include lower fluorohydrocarbons, such as tetrafluoromethane ($CF_4$), hydrofluoric acids, tetrafluoroboric acids, and hexafluorophosphoric acids.

When a fluorine atom is bonded to a surface of the carbonaceous material, the fluorine atom can be bonded by subjecting the carbon particles to a chemical treatment with fluorine or a fluorocompound.

Examples of the chemical treatment with fluorine or a fluorocompound include: a method where a plasma treatment is performed on carbon particles in a lower fluorohydrocarbon gas atmosphere, such as tetrafluoromethane ($CF_4$) with stirring the carbon particles; a method where carbon particles are immersed in a solution, such as hydrofluoric acid, tetrafluoroboric acid, and hexafluorophosphoric acid; and a method where carbon particles are treated with fluorine atom-containing gas at a high temperature. Among them, the method where a plasma treatment is performed on carbon particles in a lower fluorohydrocarbon gas atmosphere, such as tetrafluoromethane ($CF_4$) with stirring the carbon particles is preferable.

A state of fluorine or a fluorocompound present in a surface of the carbonaceous material can be confirmed by various analysis method.

In a case where the fluorine or the fluorocompound is chemically bonded to a functional group present at the surface of the carbonaceous material, the fluorine or the fluorocompound can be detected as carbide of fluorine or fluoride of carbon by X-ray photoelectron spectroscopy (XPS or ESCA). Moreover, the presence of the fluorine or the fluorocompound can be analyzed by secondary ion mass spectrometry (SIMS), reflection infrared spectroscopy, etc.

An amount of the fluorine element in a surface of the carbonaceous material measured by X-ray photoelectron spectroscopy is preferably 0.1 at % or greater but 20 at % or less and more preferably 0.2 at % or greater but 5 at % or less. When the amount is within the preferable numeral range, charge-discharge properties of a resultant electricity-storage element can be improved.

A positive electrode, negative electrode, non-aqueous electrolyte, separator, and other constitutional elements of the non-aqueous electrolyte electricity-storage element of the present disclosure are not particularly limited and may be appropriately selected depending on the intended purpose, as long as the above-described properties are met. The constitutional elements of the non-aqueous electrolyte electricity-storage element of the present disclosure will be specifically described below.

<Positive Electrode>

The positive electrode is not particularly limited and may be appropriately selected depending on the intended purpose, as long as the positive electrode includes a positive-electrode electricity-storing material (e.g., a positive-electrode active material). Examples of the positive electrode include a positive electrode in which a positive electrode material including a positive-electrode active material is disposed on a positive electrode collector.

A shape of the positive electrode is not particularly limited and may be appropriately selected depending on the intended purpose. Examples of the shape include plate shapes.

—Positive Electrode Material—

The positive electrode material is not particularly limited and may be appropriately selected depending on the intended purpose. For example, the positive electrode material includes at least a positive-electrode active material, and may further include a conduction auxiliary agent, a binder, a thickening agent, etc., according to the necessity.

——Positive-Electrode Active Material——

The positive-electrode active material is not particularly limited and may be appropriately selected depending on the intended purpose, as long as the positive-electrode active material is a material capable of inserting and releasing anions. Examples of the positive-electrode active material include carbonaceous material.

Examples of the carbonaceous material include coke, crystalline carbon, thermal decomposition products of organic materials under various thermal decomposition conditions, and porous carbon having communicating pores (mesopores) of a three-dimensional network structure. Among them, crystalline carbon and porous carbon having communicating pores (mesopores) of a three-dimensional network structure, where the porous carbon can suppress swelling and contraction of a cross-section of an electrode when anions are inserted or released, are particularly preferable.

Examples of the crystalline carbon include black lead (graphite), such as artificial black lead and natural black lead. Note that, the crystalline carbon may have a crystal structure at least at part, and may include an amorphous structure at part. Moreover, the entire area of the crystalline carbon may be a crystal structure.

For example, crystallinity of the carbon can be measured by Raman spectroscopy or X-ray diffraction.

The positive-electrode active material having communicating mesopores of a three-dimensional network structure is a capacitor, in which an electric double layer is formed by a pair of positive and negative electrolyte ions that are present over both sides of a face where mesopores (void areas) and a carbon material area are in contact with each other. Therefore, it can be understood that movements of electrolyte ions present as a pair are faster than the movements of electrolyte ions generated after a sequential chemical reaction with a positive-electrode active material, and an ability of supplying electricity depends on, not only a size of a volume of the void areas, but also a size of a surface area of mesopores, which allows a pair of positive and negative electrolyte ions to be present.

Considering crystallinity of the porous carbon, the time constant (slow response during charging and discharging) of the capacitor depends on, not only capacitance of a non-aqueous electrolyte, but also a resistance value of the carbon material area, with which the electrolyte forms an ohmic contact. Since both electrolyte ions perform chemical reactions, in which binding and separation with the positive-electrode active materials are repeated, moreover, there is a possibility that the porous carbon is deteriorated. The crystallinity of the porous carbon is preferably appropriately determined so as to have strength resistant to the above-described deterioration.

Note that, it is not necessary to have a crystalline structure in the entirety of the porous carbon. An amorphous part may be present at part of the porous carbon, or the entire porous carbon may be amorphous.

In the porous carbon, presence of mesopores is essential but presence of micropores is not essential. Accordingly, micropores may be present or may not be present, but at the time of carbonization, an organic material serving as a starting material of the carbon material typically releases a volatile material to carbonize. Accordingly, micropores are typically left as release marks, and therefore it is difficult to obtain a carbon material, which does not have micropores at all. On the other hand, mesopores are typically intentionally formed. As it has been known in the art, for example, it is often a case where a mark-forming material of an acid (alkali)-soluble metal, metal oxide, metal salts, or metal-containing organic material, and a carbon material or an organic material that is a raw material of the carbon material are shaped together, then the mark-forming material is dissolved with acid (alkali), and the marks left become mesopores.

In the present specification, pores having diameters of less than 2 nm are referred to as micropores, and pores having diameters of 2 nm or greater but 50 nm or less are referred to as mesopores. Since a size of the electrolyte ion is 0.5 nm or greater but 2 nm or less, it cannot be said that the micropores significantly contribute to movements of the ions. Accordingly, the presence of mesopores is important for smooth movements of the ions. For comparison, a size of pores in activated carbon, which is also a carbonaceous material, is known to be about 1 nm on average. In case of the activated carbon, it is regarded as one of adsorptions all of which generate heat (reduction in enthalpy) without exceptions.

The mesopores in the above-mentioned size preferably constitute a three-dimensional network structure. When the pores constitute a three-dimensional network structure, ions move smoothly.

A BET specific surface area of the porous carbon is preferably 50 $m^2/g$ or greater. When the BET specific surface area is 50 $m^2/g$ or greater, a sufficient amount of pores is formed and insertion of ions is sufficiently performed, hence a capacity of a resultant electricity-storage element can be made high.

On the other hand, a BET specific surface area of the porous carbon is preferably 2,000 $m^2/g$ or less. When the BET specific surface area is 2,000 $m^2/g$ or less, mesopores are sufficiently formed, insertion of ions is not inhibited, and therefore a high capacity can be obtained.

For example, the BET specific surface area can be measured by gas adsorption, etc.

The mesopores are open pores and preferably have a structure where pore areas communicate. With such a structure, ions are smoothly moved.

A pore volume of the porous carbon measured by the BJH method is preferably 0.2 mL/g or greater but 2.3 mL/g or less. When the pore volume is 0.2 mL/g or greater, mesopores rarely become independent pores in which communicating areas of the mesopores are blocked, and a large discharge capacity can be obtained without inhibiting movements of ions. When the pore volume is 2.3 mL/g or less, on the other hand, reduction in density as an electrode because the carbon is bulky and hence reduction in a capacity per unit volume can be prevented. Moreover, deterioration of cycle properties can be prevented where the cycle properties are deteriorated because carbonaceous walls constituting the pores become thin and shapes of the carbonaceous wall cannot be maintained after insertion and release of ions are repeated. Note that, the pore volume is more preferably 0.2 mL/g or greater but 1.7 mL/g or less.

For example, the pore volume can be measured by the BJH (Barrett, Joyner, Hallender) method according to gas adsorption.

The carbonaceous material is preferably in the form of a powder or particles.

In the present disclosure, it is preferable that a surface of a carbonaceous material that is the positive-electrode active material include fluorine and the carbonaceous material include carbon surface-modified with fluorine or a fluorocompound.

——Binder and Thickening Agent——

The binder and the thickening agent are not particularly limited and may be appropriately selected depending on the intended purpose, as long as the binder and the thickening agent are materials stable to a solvent used during production of an electrode or an electrolyte, or potential applied. Examples of the binder and the thickening agent include: fluorine-based binders, such as polyvinylidene fluoride (PVDF) and polytetrafluoroethylene (PTFE); ethylene-propylene-butadiene rubber (EPBR); styrene-butadiene rubber (SBR); isoprene rubber; acrylate-based latex; carboxymethyl cellulose (CMC); methyl cellulose; hydroxylmethyl cellulose; ethyl cellulose; polyacrylic acid; polyvinyl alcohol; aliginic acid; oxidized starch; starch phosphate; and casein. These may be used alone or in combination. Among them, fluorine-based binders, such as polyvinylidene fluoride (PVDF) and polytetrafluoroethylene (PTFE), acrylate-based latex, and carboxymethyl cellulose (CMC) are preferable.

——Conduction Auxiliary Agent——

Examples of the conduction auxiliary agent include: metal materials, such as copper and aluminium; and carbonaceous materials, such as carbon black, acetylene black, and carbon nanotubes. These may be used alone or in combination.

—Positive-Electrode Collector—

A material, shape, size, and structure of the positive-electrode collector are not particularly limited and may be appropriately selected depending on the intended purpose.

A material of the positive-electrode collector is not particularly limited and may be appropriately selected depending on the intended purpose, as long as the material is formed of a conductive material and is stable against applied potential. Examples of the material of the positive-electrode collector include stainless steel, nickel, aluminium, titanium, and tantalum. Among them, stainless steel and aluminium are particularly preferable.

A shape of the positive-electrode collector is not particularly limited and may be appropriately selected depending on the intended purpose.

A size of the positive-electrode collector is not particularly limited and may be appropriately selected depending on the intended purpose, as long as the size is a size usable for a non-aqueous electrolyte electricity-storage element.

—Production Method of Positive Electrode—

The positive electrode can be produced by adding the binder, the thickening agent, the conductive auxiliary agent, a solvent, etc. according to the necessity, to the positive-electrode active material to form a positive electrode material in the form of slurry, applying the positive electrode material onto the positive electrode collector, and drying the applied positive electrode material. The solvent is not particularly limited and may be appropriately selected depending on the intended purpose. Examples of the solvent include aqueous solvents and organic solvents. Examples of the aqueous solvents include water and alcohol. Examples of the organic solvents include N-methyl-2-pyrrolidone (NMP) and toluene.

Note that, the positive electrode-active material may be subjected to roll molding as it is to form a sheet electrode, or to compression molding to form a pellet electrode.

<Negative Electrode>

The negative electrode is not particularly limited and may be appropriately selected depending on the intended purpose, as long as the negative electrode includes a negative-electrode active material. Examples of the negative electrode include a negative electrode in which a negative-electrode material including a negative-electrode active material is disposed on a negative-electrode collector.

A shape of the negative electrode is not particularly limited and may be appropriately selected depending on the intended purpose. Examples of the shape include a plate shape.

—Negative-Electrode Material—

The negative-electrode material includes at least a negative-electrode electricity-storing material (e.g., a negative-electrode active material), and may further include a conduction auxiliary agent, a binder, a thickening agent. Etc., according to the necessity.

——Negative-Electrode Active Material——

The negative-electrode active material is not particularly limited and may be appropriately selected depending on the intended purpose. The negative-electrode active material is preferably a material capable of accumulating and releasing metal lithium, or lithium ions, or both. Specific examples of the negative-electrode active material include carbonaceous materials, metal oxides capable of accumulating and releasing lithium, such as antimony-doped tin oxide and silicon monoxide, metals of metal alloys capable of forming an alloy with lithium, such as aluminium, thin, silicon, and zinc, composite alloy compounds each including a metal capable of forming an alloy with lithium, an alloy including the metal and lithium, metal lithium nitride such as cobalt lithium nitride, and lithium to titanate. These may be used alone or in combination. Among them, a carbonaceous material and lithium titanate are particularly preferable in view of safety and a cost.

Examples of the carbonaceous material include: black lead (graphite), such as coke, artificial black lead, and natural black lead; and thermal decomposition products of organic materials under various thermal decomposition conditions. Among them, artificial black lead and natural black lead are particularly preferable.

——Binder and Thickening Agent——

The binder and the thickening agent are not particularly limited and may be appropriately selected depending on the intended purpose, as long as the binder and the thickening agent are materials stable to a solvent used during production of an electrode or an electrolyte, or potential applied. Examples of the binder and the thickening agent include: fluorine-based binders, such as polyvinylidene fluoride (PVDF) and polytetrafluoroethylene (PTFE); ethylene-propylene-butadiene rubber (EPBR); styrene-butadiene rubber (SBR); isoprene rubber; acrylate-based latex; carboxymethyl cellulose (CMC); methyl cellulose; hydroxylmethyl cellulose; ethyl cellulose; polyacrylic acid; polyvinyl alcohol; aliginic acid; oxidized starch; starch phosphate; and casein. These may be used alone or in combination. Among them, fluorine-based binders, such as polyvinylidene fluoride (PVDF) and polytetrafluoroethylene (PTFE), styrene-butadiene rubber (SBR), and carboxymethyl cellulose (CMC) are preferable.

——Conduction Auxiliary Agent——

Examples of the conduction auxiliary agent include: metal materials, such as copper and aluminium; and carbonaceous materials, such as carbon black, acetylene black, and carbon nanotubes. These may be used alone or in combination.

—Negative-Electrode Collector—

A material, shape, size and structure of the negative-electrode collector are not particularly limited and may be appropriately selected depending on the intended purpose.

A material of the negative-electrode collector is not particularly limited and may be appropriately selected depending on the intended purpose, as long as the material is formed of a conductive material and is stable against applied potential. Examples of the material include stainless steel, nickel, aluminium, and copper. Among them, stainless steel, copper, and aluminium are particularly preferable.

A shape of the collector is not particularly limited and may be appropriately selected depending on the intended purpose.

A size of the collector is not particularly limited and may be appropriately selected depending on the intended purpose, as long as the size is a size usable for a non-aqueous electrolyte electricity-storage element.

—Production Method of Negative Electrode—

The negative electrode can be produced by adding the binder, the thickening agent, the conduction auxiliary agent, a solvent, etc. according to the necessity, to the negative-electrode active material to form a negative electrode material in the form of slurry, applying the negative electrode material onto the negative electrode collector, and drying the applied negative electrode material. As the solvent, any of the solvents listed as examples of the solvent for use in the production method of the positive electrode can be used.

Moreover, the negative-electrode active material, to which the binder, the thickening agent, the conduction auxiliary agent, etc., are added, may be subjected to roll molding as it is to form a sheet electrode, or to compression molding to form a pellet electrode, or a method, such as vapor deposition, sputtering, and plating, to form a thin film of the negative-electrode active material on the negative electrode collector.

<Non-Aqueous Electrolyte>

The non-aqueous electrolyte is an electrolyte formed by dissolving an electrolyte salt in a non-aqueous solvent.

—Non-Aqueous Solvent—

The non-aqueous solvent is not particularly limited and may be appropriately selected depending on the intended purpose. The non-aqueous solvent is suitably an aprotic organic solvent.

As the aprotic organic solvent, a carbonate-based organic solvent, such as chain carbonate and cyclic carbonate, is used. The aprotic organic solvent is preferably a solvent of low viscosity. Among the above-listed solvents, chain carbonate is preferable because the chain carbonate has high solubility to an electrolyte salt. Among then, chain carbonate is preferable because the chain carbonate has a high dissolving power against an electrolyte salt.

Examples of the chain carbonate include dimethyl carbonate (DMC), diethyl carbonate (DEC), and methyl ethyl carbonate (EMC). Among them, dimethyl carbonate (DMC) is preferable.

An amount of the DMC is not particularly limited and may be appropriately selected depending on the intended purpose, but the amount of the DMC is preferably 70% by mass or greater and more preferably 83% by mass or greater relative to the non-aqueous solvent. When the amount of the DMC is less than 70% by mass, an amount of a cyclic material having a high dielectric constant increases, in the case where the rest of the solvent is the cyclic material having a high dielectric constant (e.g., cyclic carbonate and cyclic ester), and therefore a viscosity becomes excessively high when a non-aqueous electrolyte of high concentration of 3 mol/L, is produced, which may cause problems in permeation of the non-aqueous electrolyte in electrode, or diffusion of ions.

Examples of the cyclic carbonate include propylene carbonate (PC), ethylene carbonate (EC), butylene carbonate (BC), vinylene carbonate (VC), and fluoroethylene carbonate (FEC).

Among them, the non-aqueous solvent is preferably at least one selected from the group consisting of dimethyl carbonate (DMC), ethylene carbonate (EC), and fluoroethylene carbonate (FEC).

When ethylene carbonate (EC) as the cyclic carbonate and dimethyl carbonate (DMC) as the chain carbonate are used in combination as a mixed solvent, a blending ratio between ethylene carbonate (EC) and dimethyl carbonate (DMC) is not particularly limited and may be appropriately selected depending on the intended purpose.

When ethylene carbonate (EC) and fluoroethylene carbonate (FEC) as the cyclic carbonates and dimethyl carbonate (DMC) as the chain carbonate are used in combination as a mixed solvent, a blending ratio between ethylene carbonate (EC), fluoroethylene carbonate (FEC), and dimethyl carbonate (DMC) is not particularly limited and may be appropriately selected depending on the intended purpose.

As the non-aqueous solvent, ester-based organic solvents, such as cyclic ester and chain ester, and ether-based organic solvents, such as cyclic ether and chain ether, may be used according to the necessity.

Examples of the cyclic ester include γ-butyrolactone (γ-BL), 2-methyl-γ-butyrolactone, acetyl-γ-butyrolactone, and γ-valerolactone.

Examples of the chain ester include alkyl propionate, dialkyl malonate, alkyl acetate (e.g., methyl acetate (MA) and ethyl acetate), and alkyl formate (e.g., methyl formate (MF) and ethyl formate).

Examples of the cyclic ether include tetrahydrofuran, alkyltetrahydrofuran, alkoxy tetrahydrofuran, dialkoxy tetrahydrofuran, 1,3-dioxolan, alkyl-1,3-dioxolan, and 1,4-dioxolan.

Examples of the chain ether include 1,2-dimethoxyethane (DME), diethyl ether, ethylene glycol dialkyl ether, diethylene glycol dialkyl ether, triethylene glycol dialkyl ether, and tetraethylene glycol dialkyl ether.

—Electrolyte Salt—

A lithium salt is preferable as the electrolyte salt. The lithium salt is not particularly limited as long as the lithium salt is dissolved in a non-aqueous solvent to exhibits high ion conductivity. Examples of the lithium salt include lithium hexafluorophosphate ($LiPF_6$), lithium perchlorate ($LiClO_4$), lithium chloride (LiCl), lithium fluoroborate ($LiBF_4$), lithium hexafluoroarsenate ($LiAsF_6$), lithium trifluoromethanesulfonate ($LiCF_3SO_3$), lithium bistrifluoromethylsulfonyl imide ($LiN(C_2F_5SO_2)_2$), and lithium bisperfluoroethylsulfonyl imide ($LiN(CF_2F_5SO_2)_2$). These may be used alone or in combination. Among them, $LiPF_6$ is particularly preferable because of a large amount of anions accumulated in a carbon electrode.

A concentration of a lithium salt as the electrolyte salt is not particularly limited and may be appropriately selected depending on the intended purpose. The concentration of the lithium salt in the non-aqueous solvent is preferably 0.5 mol/L or greater but 6 mol/L or less and more preferably 2 mol/L or greater but 4 mol/L or less in view of both a capacity and output of the electricity-storage element.

<Separator>

The separator is disposed between the positive electrode and the negative electrode for preventing a short circuit between the positive electrode and the negative electrode.

A material, shape, size, and structure of the separator is not particularly limited and may be appropriately selected depending on the intended purpose.

Examples of a material of the separator include: paper such as Kraft paper, vinylon blended paper, and synthetic pulp blended paper; cellophane; polyethylene graft membranes; polyolefin nonwoven fabric, such as polypropylene melt-flow to nonwoven fabric; glass fiber nonwoven fabric; and micropore membranes.

Among them, a material having a porosity of 50% or greater is preferable in view of retention of a non-aqueous electrolyte.

As the shape of the separator, a nonwoven fabric having a high porosity is more preferable than a thin film-type having fine pores (micropores).

A thickness of the separator is preferably 20 μm or greater in view of prevention of a short circuit and retention of an electrolyte.

A size of the separator is not particularly limited and may be appropriately selected depending on the intended purpose, as long as the size is a size usable for the non-aqueous electrolyte electricity-storage element.

A structure of the separator may be a single-layer structure or a laminate structure.

<Production Method of Non-Aqueous Electrolyte Electricity-Storage Element>

A non-aqueous electrolyte electricity-storage element of the present disclosure can be produced by assembling the positive electrode, the negative electrode, the non-aqueous electrolyte, and optionally a separator into an appropriate shape. Moreover, other constitutional members, such as an outer tin, can be used according to the necessity. A method for assembling the non-aqueous electrolyte electricity-storage element is not particularly limited and may be appropriately selected from methods typically used.

Here, FIG. 1 is a schematic view illustrating one example of a non-aqueous electrolyte electricity-storage element of the present disclosure. The non-aqueous electrolyte electricity-storage element 10 includes, inside an outer tin 4, a positive electrode 1 including a positive-electrode active material capable of reversibly accumulating and releasing anions, a negative electrode 2 including a negative-electrode active material, and a separator 3 disposed between the positive electrode 1 and the negative electrode 2. The positive electrode 1, the negative electrode 2, and the separator 3 are immersed in a non-aqueous electrolyte (not illustrated) formed by dissolving an electrolyte salt in a non-aqueous solvent. Note that, "5" is a negative-electrode lead-out line and "6" is a positive-electrode lead-out line.

A shape of the non-aqueous electrolyte electricity-storage element of the present disclosure is not particularly limited and may be appropriately selected from various shapes typically used depending on the intended use. Examples of the shape include a cylinder-type where sheet electrodes and a separator are spirally disposed, a cylinder-type having an inside-out structure where pellet electrodes and a separator are combined, and a coin-type where pellet electrodes and a separator are laminated.

<Use>

Examples of a non-aqueous electrolyte electricity-storage element of the present disclosure include non-aqueous electrolyte secondary cells and non-aqueous electrolyte capacitors.

Use of the non-aqueous electrolyte electricity-storage element is not particularly limited and the non-aqueous electrolyte electricity-storage element can be used for various types of use. Examples of the use of the non-aqueous electrolyte electricity-storage element include power sources or back-up power sources for laptop computers, stylus-operated computers, mobile computers, electronic book players, mobile phones, mobile facsimiles, mobile photocopiers, mobile printers, headphone stereos, video movie players, liquid crystal televisions, handy cleaners, portable CD players, minidisk players, transceivers, electronic organizers, calculators, memory cards, mobile tape recorders, radios, motors, lighting equipment, toys, game equipment, clocks, strobes, and cameras.

EXAMPLES

Examples of the present disclosure will be described hereinafter, but the present disclosure should not be construed as being limited to these Examples.

Example 1

<Surface Modification of Positive-Electrode Active Material With Fluorine>

As a positive-electrode active material, a carbon powder (KS-6, available from TIMCAL) was used. After vacuuming inside a reaction vessel using a rotary desktop plasma device (YHS-DφS, available from SAKIGAKE-Semiconductor Co., Ltd.), methane tetrafluoride ($CF_4$) was introduced as reaction gas in a manner that an internal pressure of the vessel was to be 100 Pa, and a plasma treatment was performed for 20 minutes with stirring the carbon powder at an output of 300 W and a frequency of 13.56 MHz, to thereby obtain a carbon powder surface of which had been modified with fluorine. The carbon powder was analyzed by X-ray photoelectron spectroscopy in the following manner. As a result, the fluorine atom was confirmed at 688 eV, and an amount of the fluorine element on the surface of the carbon powder modified with a fluorocompound serving as a positive-electrode active material was 3.29 at %.

—Analysis by X-Ray Photoelectron Spectroscopy—

A measurement by means of the X-ray photoelectron spectroscopy was performed by means of AXIS-Ultra (available from Kratos) under the following conditions.

[Conditions]

Measuring light source: Al (monochrome meter)

Measuring output: 105 W (15 kV, 10 mA)

Analysis area: 900×600 mm$^2$

Measuring mode: Hybrid mode

Pass energy: (wide scan) 160 eV, (narrow scan) 20 eV

Energy step: (wide scan) 1.0 eV, (narrow scan) 0.2 eV

Relative sensitivity factor: The relative sensitivity factor of Kratos Analytical Ltd. was used.

<Production of Positive Electrode>

As a positive-electrode active material, the carbon powder surface-modified with the fluorocompound of Example 1 was used. The positive-electrode active material, acetylene black (Denka Black powder, available from Denka Company Limited) serving as a conduction auxiliary agent, an acrylate-based latex (TRD202A, available from JSR Corporation) serving as a binder, and carboxymethyl cellulose (DAICEL 2200, available from Daicel Corporation) serving as a thickening agent were mixed in a manner that a mass ratio of the mixture based on each of the solid contents were to be 100:7.5:3.0:3.8. Water was added to the resultant mixture to adjust the viscosity of the mixture to an appropriate degree, to thereby obtain a slurry.

Next, the obtained slurry was applied onto one side of an aluminium foil having a thickness of 20 μm using a doctor blade. An average applied amount after drying (mass of the carbon active material powder in the applied positive electrode) was 10 mg/cm$^2$. The resultant was cut out into a circle having a diameter of 16 mm to thereby produce a positive electrode.

<Separator>

As a separator, two sheets of glass filter paper (GA100, available from ADVANTEC) each of which was cut out into a circle having a diameter of 16 mm were prepared.

<Production of Negative Electrode>

As a negative-electrode active material, artificial black lead (MAGD, available from Hitachi Chemical Co., Ltd.) was used. The negative-electrode active material, acetylene black (Denka Black powder, available from Denka Company Limited) serving as a conduction auxiliary agent, a SBR-based binder (EX1215, available from Denka Company Limited) serving as a binder, and carboxymethyl cellulose (DAICEL 2200, available from Daicel Corporation) serving as a thickening agent were mixed in a manner that a mass ratio of the mixture based on each of the solid contents were to be 100:5.0:3.0:2.0. Water was added to the resultant mixture to adjust the viscosity of the mixture to an appropriate degree, to thereby obtain a slurry.

Next, the obtained slurry was applied onto one side of a copper foil having a thickness of 18 μm using a doctor blade. An average applied amount after drying (mass of the carbon active material powder in the applied negative electrode) was 10 mg/cm$^2$. The resultant was cut out into a circle having a diameter of 16 mm to thereby produce a negative electrode.

<Non-Aqueous Electrolyte>

As a non-aqueous electrolyte, a 2 mol/L LiPF$_6$ dimethyl carbonate (DMC) solution (available from KISHIDA CHEMICAL Co., Ltd.) was used.

<Production of Electricity-Storage Element>

After vacuum drying the positive electrode, the negative electrode, and the separator for 4 hours at 150° C., a 2032 coin cell as an electricity-storage element was assembled in a dry argon glove box.

In the coin cell, 400 μL of the non-aqueous electrolyte was injected to produce an electricity-storage element.

A charge-discharge test was performed on the produced electricity-storage element in the following manner.

<Charge-Discharge Test>

The produced electricity-storage element was held in a thermostat chamber of 25° C., and a charge-discharge test was performed under the following conditions.

As the charge-discharge test, an automatic battery cell evaluator (1024B-7V0.1A-4, available from Electro Field Co., Ltd.) was used. The electricity-storage element was charged to the charge termination voltage of 5.2 V with a reference current value being 2 mA. After the first charge, the electricity-storage element was discharged to 3.0 V. A pause of 5 minutes was provided between the charge and the discharge, and between the discharge and charge. This charge-discharge cycle was repeatedly performed 10 times. Thereafter, the current value of only charge was set to 5 times the reference current value (10 mA) to perform the charge, and discharge was performed with the reference current value of 2 mA. Moreover, all of charges were performed with constant current and cut-off voltage of 5.2 V and all of discharges were performed with constant current and cut-off voltage of 3.0 V, and a pause of 5 minutes was provided between the discharge and the charge. The charge was repeated until the capacity was reduced by 20% or greater relative to the discharge capacity of the first cycle when the current value was set 5 times the reference current value.

Figure 2:
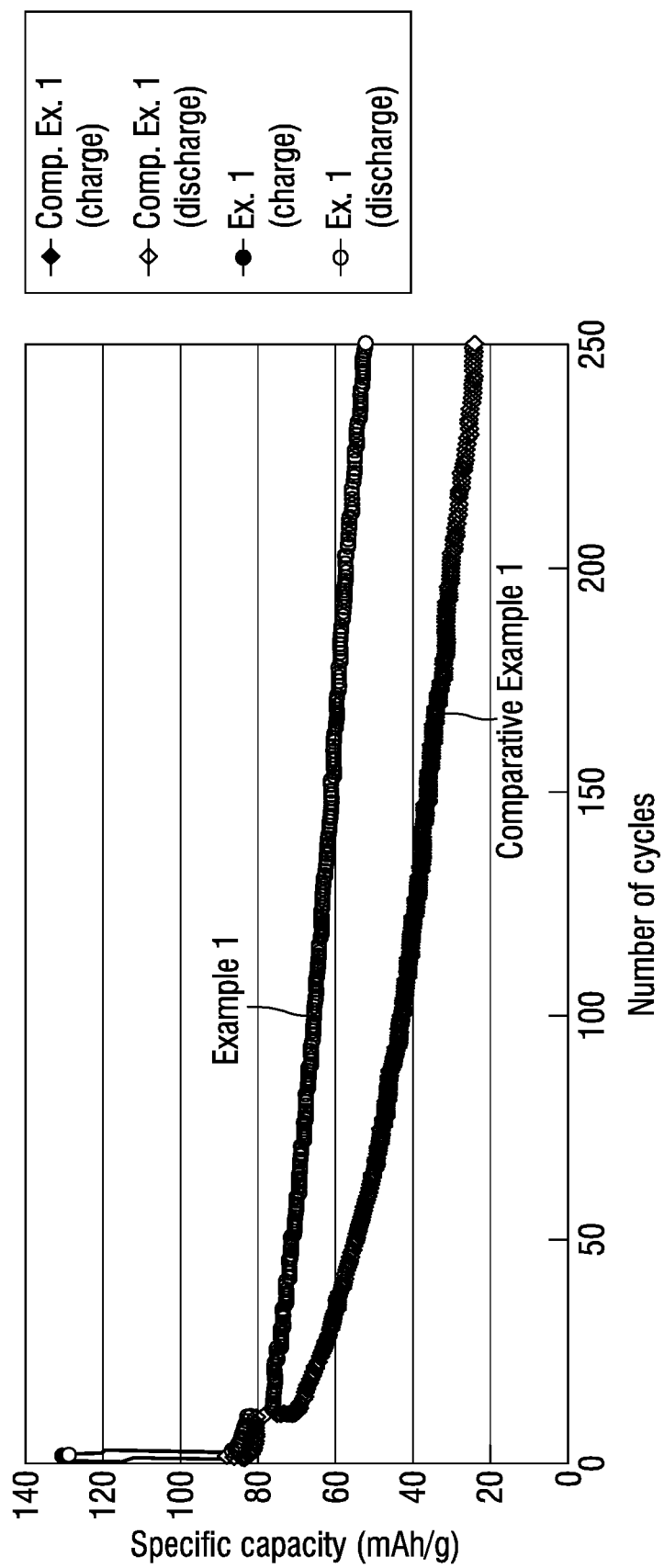
FIG. 2 is a graph depicting transitions of charge-discharge capacities of Example 1 and Comparative Example 1 over repetitive charges and discharges.

A graph in which the measurement result is plotted is presented in FIG. 2. The discharge capacity at the 10th cycle with the reference current value of 2 mA, the discharge capacity at the first cycle when charged with 5 times the reference current value, and the number of cycles when the discharge capacity retention rate became 80% or less relative to 100% of the discharge capacity at the first cycle when charged with 5 times the reference current value are presented in Table 1.

Comparative Example 1

A positive electrode and an electricity-storage element were produced and an evaluation was performed in the same manner as in Example 1, except that, as a positive-electrode active material, a carbon powder (KS-6, available from TIMCAL) that was not surface-modified with a fluorocompound was used. The results are presented in FIG. 2 and Table 1.

TABLE 1

|  | Presence of fluorine-modification of positive-electrode active material | Fluorine element amount in surface of positive-electrode active material (at %) | Discharge capacity at current value of 2 mA (mAh/g) | Discharge capacity at current value of 10 mA (mAh/g) | Cycle life (number of cycles) |
|---|---|---|---|---|---|
| Ex. 1 | Present | 3.29 | 80.7 | 75.1 | 152 |
| Comp. Ex. 1 | Not present | — | 81.2 | 69.5 | 36 |

From the results of FIG. 2 and Table 1, a significant difference was not observed in the discharge capacity of 10th cycle with the reference current value of 2 mA, but improvements in the discharge capacity of the first cycle when the charge was performed with 10 mA, 5 times the reference current value, and the cycle life were confirmed in Example 1 where the carbon powder surface-modified with the fluorocompound was used as the positive-electrode active material, compared to Comparative Example 1 where the carbon powder surface of which was unmodified with the fluorocompound was used as the positive-electrode active material.

Example 2

<Production of Electricity-Storage Element>

A positive electrode and an electricity-storage element were produced in the same manner as in Example 1, except that, as a positive-electrode active material, the carbon powder which had been surface-modified with the fluorocompound identical to the carbon powder of Example 1 was used, and as a non-aqueous electrolyte, a 2 mol/L $LiPF_6$ dimethyl carbonate (DMC):ethylene carbonate (EC):fluoroethylene carbonate (FEC)=(96:2:2(wt/wt %)) mixed solution (available from KISHIDA CHEMICAL Co., Ltd.) was used.

A charge-discharge test was performed on the produced electricity-storage element under the following manner.

<Charge-Discharge Test>

A charge-discharge test was performed in the same manner as in Example 1, except that the following conditions [1] and [2] were added before the evaluation conditions identical to Example 1 to perform aging.

[1] After charging the electricity-storage element to 5.2 V with a current value of ¼ the reference current value, the process was paused for 24 hours.

[2] After discharging the electricity-storage element to 3.0 V with the reference current value, the process was paused for 5 minutes.

Figure 3:
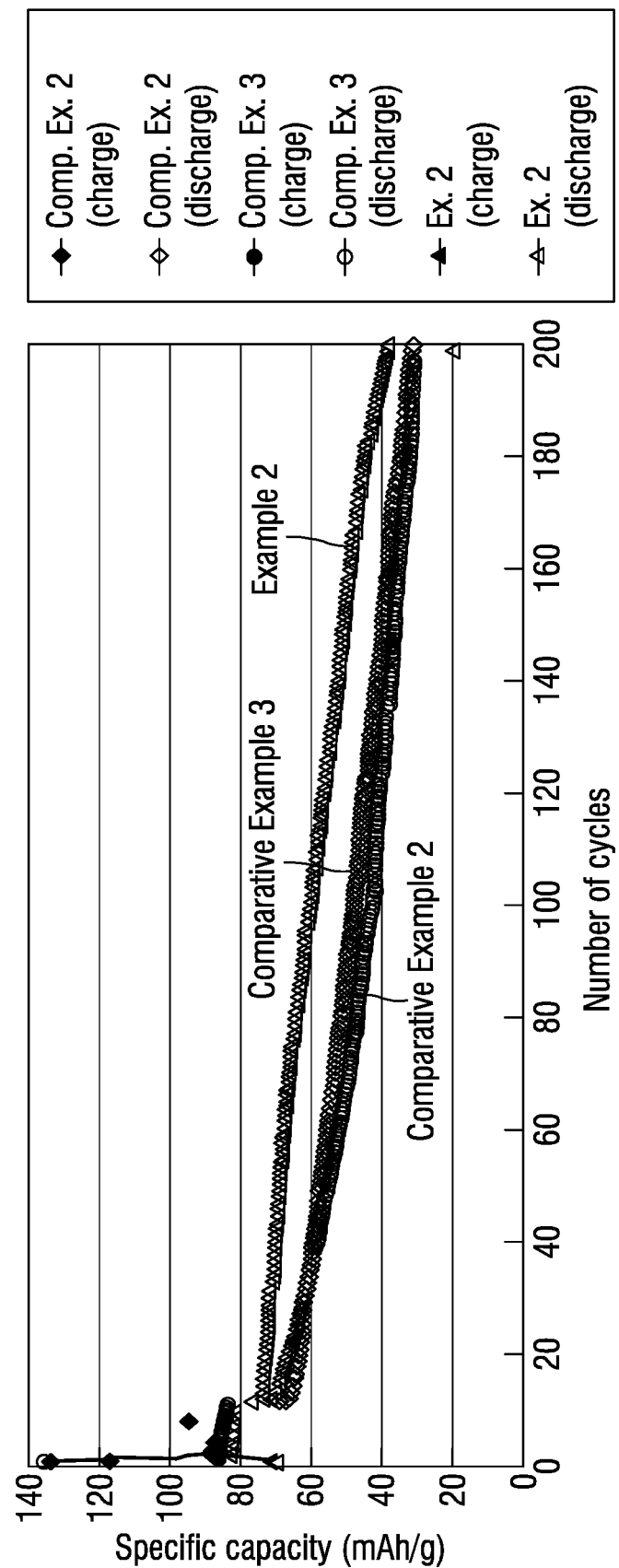
FIG. 3 is a graph depicting transitions of charge-discharge capacities of Example 2 and Comparative Examples 2 and 3 over repetitive charges and discharges.

A graph in which the measurement result is plotted is presented in FIG. 3. The discharge capacity at the 10th cycle with the reference current value of 2 mA, the discharge capacity at the first cycle when charged with 5 times the reference current value, i.e., 10 mA, and the number of cycles when the discharge capacity retention rate became 80% or less relative to 100% of the discharge capacity at the first cycle when charged with 5 times the reference current value are presented in Table 2.

Comparative Example 2

<Production and Evaluation of Electricity-Storage Element>

A positive electrode and an electricity-storage element were produced and an evaluation was performed in the same manner as in Example 2, except that, as a positive-electrode active material, a carbon powder (KS-6, available from TIMCAL) that was not surface-modified with a fluorocompound was used. The results are presented in FIG. 3 and Table 2.

Comparative Example 3

<Preparation of Positive-Electrode Active Material>

As a carbon active material, a carbon powder (KS-6, available from TIMCAL) was used. In order to obtain a carbon powder that was not surface-modified with a fluorocompound and was only influenced by plasma, after vacuuming inside a reaction vessel, air was introduced without using reaction gas by means of the device identical to the device used for the surface modification with the fluorocompound in Example 1, in a manner that an internal pressure of the vessel was to be 100 Pa, and a plasma treatment was performed for 20 minutes at an output of 300 W and a frequency of 13.56 MHz with stirring the carbon powder, to thereby obtain a carbon powder to which only the plasma treatment had been performed.

<Production and Evaluation of Electricity-Storage Element>

A positive electrode and an electricity-storage element were produced and an evaluation was performed in the same manner as in Example 2, except that as a positive-electrode active material, the carbon powder to which only the plasma treatment had been performed was used. The results are presented in FIG. 3 and Table 2.

TABLE 2

|  | Presence of fluorine-modification of positive-electrode active material | Fluorine element amount in surface of positive-electrode active material (at %) | Discharge capacity at current value of 2 mA (mAh/g) | Discharge capacity at current value of 10 mA (mAh/g) | Cycle life (number of cycles) |
|---|---|---|---|---|---|
| Ex. 2 | Present | 3.29 | 81.5 | 73.5 | 96 |
| Comp. Ex. 2 | Not present | — | 81.8 | 69.2 | 37 |

TABLE 2-continued

| | Presence of fluorine-modification of positive-electrode active material | Fluorine element amount in surface of positive-electrode active material (at %) | Discharge capacity at current value of 2 mA (mAh/g) | Discharge capacity at current value of 10 mA (mAh/g) | Cycle life (number of cycles) |
|---|---|---|---|---|---|
| Comp. Ex. 3 | Not present (only plasma) | — | 82.1 | 65.6 | 61 |

From the results of FIG. 3 and Table 2, no significant difference was observed in the discharge capacity of 10th cycle with the reference current value of 2 mA, but improvements were confirmed in the discharge capacity of the first cycle when the charge was performed with 10 mA, 5 times the reference value, and the cycle life in Example 2 where the carbon powder surface-modified with the fluorocompound was used as the positive-electrode active material, compared to Comparative Example 2 where the carbon powder surface of which was unmodified with the fluorocompound was used as the positive-electrode active material.

Moreover, no significant difference was observed in the discharge capacity of 10th cycle with the reference current value of 2 mA, but improvements were confirmed in the discharge capacity of the first cycle when the charge was performed with 10 mA, 5 times the reference value, and the cycle life in Example 2 where the carbon powder surface-modified with the fluorocompound was used as the positive-electrode active material, compared to Comparative Example 3 where the carbon powder to which surface modification with a fluorocompound was not performed but only the plasma treatment was performed was used as the positive-electrode active material.

It was found from the results of Table 1 and Table 2 that the discharge capacity at the time of the rapid charge and the cycle life non-aqueous solvent were improved by performing the surface modification with the fluorocompound even when a different non-aqueous solvent, such as dimethyl carbonate (DMC), and a mixed solution of DMC, ethylene carbonate (EC), and fluoroethylene carbonate (FEC) was used. The effectiveness of the carbon powder surface-modified with the fluorocompound as the positive-electrode active material was confirmed from the results above.

Example 3

<Production and Evaluation of Electricity-Storage Element>

Electrodes and an electricity-storage element were produced in the same manner as in Example 1, except that as a positive-electrode active material, the carbon powder which had been surface-modified with the fluorocompound identical to the carbon powder of Example 1 was used, and a lithium metal foil having a diameter of 16 mm was used as a negative electrode.

A charge-discharge test was performed on the produced electricity-storage element under the following manner.

<Charge-Discharge Test>

The produced electricity-storage element was held in a thermostat chamber of 25° C., as a charge-discharge test, a charge-discharge test was performed under the conditions presented by the following [1] to [10]. The reference current value was set to 2 mA. In the [4] and [8], the current value was set 5 times the reference current value (5 C) and 10 times the reference current value (10 C) only for discharge to confirm properties at the time of rapid discharge. In the [6] and [10], the current value was set 5 times the reference current value (5 C) and 10 times the reference current value (10 C) only for charge to confirm properties at the time of rapid charge. Moreover, in the [3] and after the [3], charge was performed with constant current and cut-off voltage of 5.2 V, discharge was performed with cut-off voltage of 3.0 V, and a pause of 5 minutes was provided between the charge and the discharge and between the discharge and the charge.

[1]: After charging the electricity-storage element to 5.2 V with the current value of ¼ the reference current value of 2 mA, the process was paused for 24 hours.

[2]: After discharging the electricity-storage element to 3.0 V with the reference current value of 2 mA, the process was paused for 5 minutes.

[3]: A cycle of charge with 2 mA and discharge with 2 mA was performed 10 times.

[4]: A cycle of charge with 2 mA and discharge with 10 mA was performed 5 times.

[5]: A cycle of charge with 2 mA and discharge with 2 mA was performed twice.

[6]: A cycle of charge with 10 mA and discharge with 2 mA was performed 5 times.

[7]: A cycle of charge with 2 mA and discharge with 2 mA was performed twice.

[8]: A cycle of charge with 2 mA and discharge with 20 mA was performed 5 times.

[9]: A cycle of charge with 2 mA and discharge with 2 mA was performed twice.

[10]: A cycle of charge with 20 mA and discharge with 2 mA was performed 5 times.

Figure 4:
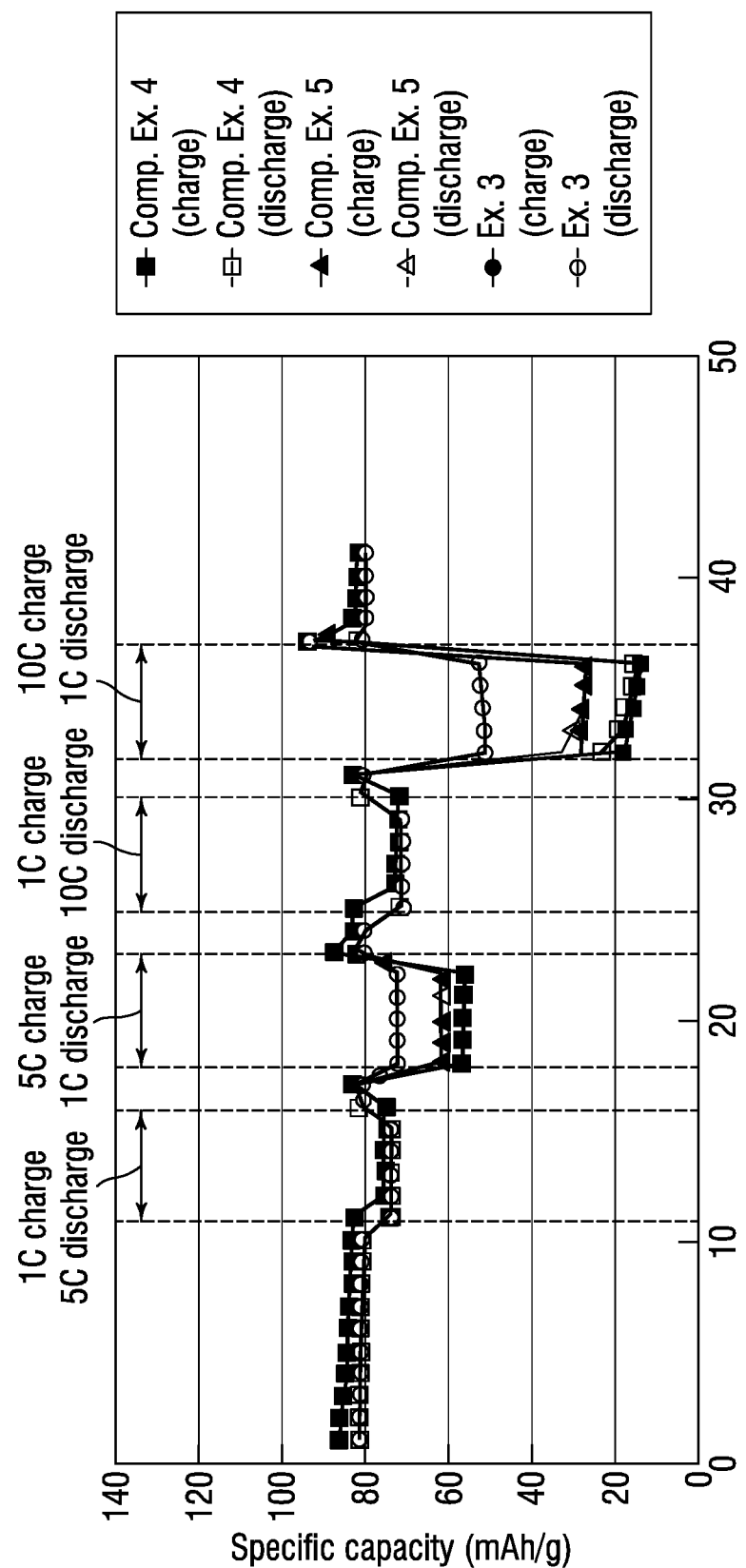
FIG. 4 is a graph depicting transitions of charge-discharge capacities of Example 3 and Comparative Examples 4 and 5 when current values of charge and discharge are varied.

A graph in which the specific capacity under each of the charge-discharge conditions is plotted is presented in FIG. 4. The discharge capacity at the 10th cycle with the reference value of [3] above, and the retention rate (%) of the discharge capacity at the 3rd cycle of each of [4], [6], [8], and [10] above relative to the discharge capacity at the 10th cycle with the reference value of [3] are presented in Table 3.

Comparative Example 4

<Production of Electricity-Storage Element>

A positive electrode and an electricity-storage element were produced and an evaluation was performed in the same manner as in Example 3, except that as a positive-electrode active material, a carbon powder (KS-6, available from TIMCAL) that was not surface-modified with a fluorocompound was used. The results are presented in FIG. 4 and Table 3.

Comparative Example 5

<Production of Electricity-Storage Element>

A positive electrode and a battery cell were produced and an evaluation was performed in the same manner as in Example 3, except that as a positive-electrode active material, the carbon powder, to which only the plasma treatment was performed, identical to the carbon powder of Comparative Example 3 was used. The results are presented in FIG. 4 and Table 3.

TABLE 3

| | Presence of fluorine-modification of positive-electrode active material | Fluorine element amount in surface of positive-electrode active material (at %) | Discharge capacity at 10th cycle with current value of [3] (mAh/g) | Retention rate of discharge capacity at 3rd cycle (%) | | | |
|---|---|---|---|---|---|---|---|
| | | | | [4] | [6] | [8] | [10] |
| Ex. 3 | Present | 3.29 | 80.7 | 91.3 | 89.2 | 88.1 | 64.3 |
| Comp. Ex. 4 | Not present | — | 81.5 | 91.1 | 69.7 | 87.1 | 21.1 |
| Comp. Ex. 5 | Not present (only plasma) | — | 80.9 | 91.2 | 76.1 | 88.1 | 35.3 |

It was found from the results of FIG. 4 and Table 3 that the discharge capacity at the time of the rapid charge was particularly large, and the value of the capacity retention rate was also high in Example 3 where the carbon powder surface-modified with the fluorocompound was used as the positive-electrode active material even when the lithium metal foil was used as the negative electrode, compared with Comparative Example 4 where the lithium metal foil was used as the negative electrode and the carbon powder surface of which was unmodified with the fluorocompound was used as the positive-electrode active material, and Comparative Example 5 where the carbon powder to which surface modification with a fluorocompound was not performed but only a plasma treatment was performed was used as the positive-electrode active material.

Example 4

<Surface Modification of Positive-Electrode Carbon Active Material>

A carbon powder which was surface-modified with a fluorocompound was obtained in the same manner as in Example 1, except that a plasma treatment using $CF_4$ as reaction gas was performed for 5 minutes. The obtained carbon powder was analyzed by X-ray photoelectron spectroscopy in the same manner as in Example 1. As a result, the fluorine atom was confirmed at 688 eV and an amount of the fluorine element was 0.08 at %.

<Production of Positive Electrode and Electricity-Storage Element>

A positive electrode and an electricity-storage element were produced and an evaluation was performed in the same manner as in Example 2, except that as a positive-electrode active material, the carbon powder surface-modified with the fluorocompound in Example 4 was used.

The discharge capacity at the 10th cycle with the reference current value of 2 mA, the discharge capacity at the first cycle when charged with 5 times the reference current value, and the number of cycles when the discharge capacity retention rate became 80% or less relative to 100% of the discharge capacity at the first cycle when charged with 5 times the reference current value are presented in Table 4.

Note that, the results of Example 2 and Comparative Example 2 are also presented in Table 4.

Example 5

<Surface Modification of Positive-Electrode Carbon Active Material>

A carbon powder surface-modified with a fluorocompound was obtained in the same manner as in Example 1, except that a plasma treatment using $CF_4$ as reaction gas was performed for 10 minutes. The obtained carbon powder was analyzed by X-ray photoelectron spectroscopy in the same manner as Example 1. As a result, the fluorine atom was confirmed at 688 eV and an amount of the fluorine element was 0.18 at %.

<Production of Positive Electrode and Electricity-Storage Element>

A positive electrode and an electricity-storage element were produced and an evaluation was performed in the same manner as in Example 2, except that as a positive-electrode active material, the carbon powder surface-modified with the fluorocompound produced in Example 5 was used. The results are presented in Table 4.

Example 6

<Surface Modification of Positive-Electrode Carbon Active Material>

A carbon powder surface-modified with a fluorocompound was obtained in the same manner as in Example 1, except that a plasma treatment using $CF_4$ as reaction gas was performed for 30 minutes. The obtained carbon powder was analyzed by X-ray photoelectron spectroscopy in the same manner as in Example 1. As a result, the fluorine atom was confirmed at 688 eV and an amount of the fluorine element was 4.05 at %.

<Production of Positive Electrode and Electricity-Storage Element>

A positive electrode and an electricity-storage element were produced and an evaluation was performed in the same manner as in Example 2, except that, as a positive-electrode active material, the carbon powder surface-modified with the fluorocompound produced in Example 6 was used. The results are presented in Table 4.

Example 7

<Surface Modification of Positive-Electrode Carbon Active Material>

A carbon powder surface-modified with a fluorocompound was obtained in the same manner as in Example 1, except that a plasma treatment using $CF_4$ as reaction gas was performed for 60 minutes. The obtained carbon powder was analyzed by X-ray photoelectron spectroscopy in the same manner as in Example 1. As a result, the fluorine atom was confirmed at 688 eV and an amount of the fluorine element was 5.03 at %.

<Production of Positive Electrode and Electricity-Storage Element>

A positive electrode and an electricity-storage element were produced and an evaluation was performed in the same manner as in Example 2, except that, as a positive-electrode active material, the carbon powder surface-modified with the fluorocompound produced in Example 7 was used. The results are presented in Table 4.

Example 8

<Surface Modification of Positive-Electrode Carbon Active Material>

A carbon powder surface-modified with a fluorocompound was obtained in the same manner as in Example 1, except that a plasma treatment using $CF_4$ as reaction gas was performed for 360 minutes. The obtained carbon powder was analyzed by X-ray photoelectron spectroscopy in the same manner as in Example 1. As a result, the fluorine atom was confirmed at 688 eV and an amount of the fluorine element was 19.91 at %.

<Production of Positive Electrode and Electricity-Storage Element>

A positive electrode and an electricity-storage element were produced and an evaluation was performed in the same manner as in Example 2, except that, as a positive-electrode active material, the carbon powder surface-modified with the fluorocompound produced in Example 8 was used. The results are presented in Table 4.

Example 9

<Surface Modification of Positive-Electrode Carbon Active Material>

A carbon powder surface-modified with a fluorocompound was obtained in the same manner as in Example 1, except that a plasma treatment using $CF_4$ as reaction gas was performed for 600 minutes. The obtained carbon powder was analyzed by X-ray photoelectron spectroscopy in the same manner as in Example 1. As a result, the fluorine atom was confirmed at 688 eV and an amount of the fluorine element was 21.20 at %.

<Production of Positive Electrode and Electricity-Storage Element>

A positive electrode and an electricity-storage element were produced and an evaluation was performed in the same manner as in Example 2, except that, as a positive-electrode active material, the carbon powder surface-modified with the fluorocompound produced in Example 9 was used. The results are presented in Table 4.

TABLE 4

|  | Presence of fluorine-modification of positive-electrode active material | Fluorine element amount in surface of positive-electrode active material (at %) | Discharge capacity at 10th cycle (mAh/g) | Discharge capacity at 11th cycle (mAh/g) | Cycle life (number of cycles) |
|---|---|---|---|---|---|
| Ex. 2 | Present | 3.29 | 81.5 | 73.5 | 96 |
| Ex. 4 | Present | 0.08 | 81.9 | 66.9 | 59 |
| Ex. 5 | Present | 0.18 | 81.3 | 69.8 | 72 |
| Ex. 6 | Present | 4.05 | 81.1 | 74.0 | 119 |
| Ex. 7 | Present | 5.03 | 81.5 | 75.9 | 162 |
| Ex. 8 | Present | 19.91 | 79.8 | 68.8 | 228 |
| Ex. 9 | Present | 21.20 | 75.2 | 53.2 | 189 |
| Comp. Ex. 2 | Not present | — | 81.8 | 69.2 | 37 |

From the results of Table 4, an improvement in the cycle life was confirmed in Examples 2 and 4 to 8 where the carbon powder surface-modified with the fluorocompound was used as the positive-electrode active material, compared to Comparative Example 2 where the carbon powder surface of which was unmodified with a fluorocompound was used as the positive-electrode active material.

Moreover, the amount of the fluorine element was 21.20 at % in Example 9, but the discharge capacity of the 10th cycle with the reference current value of 2 mA and the discharge capacity of the first cycle when the charge was performed with 5 times the reference current value were significantly reduced compared to other Examples 2 and 4 to 8. Moreover, a reduction in each of the discharge capacities was significant also compared to Comparative Example 2 where the carbon powder surface of which was unmodified with the fluorocompound was used as the positive-electrode active material.

It was found from the results above that the amount of the fluorine element in the surface of the carbonaceous material that was the positive-electrode active material was preferably 0.1 at % through 20 at %, with the upper limit being 19.91 at % through 20 at % of Example 8.

Moreover, it was found that the amount of the fluorine element in the surface of the carbonaceous material at which the discharge capacity of the 10th cycle with the reference current value of 2 mA, the discharge capacity of the first time when the charge was performed with 5 times the reference current value, and the cycle life could be all improved was 0.2 at % through 5 at %.

Example 10

<Production of Positive Electrode>

A positive electrode was produced in the same manner as in Example 1, except that, as a positive-electrode active material, the carbon powder the carbon powder which had been to surface-modified with the fluorocompound identical to the carbon powder of Example 1 was used to prepare a slurry, and an average applied amount of the slurry was set to 3.0 mg/cm².

<Production of Negative Electrode>

Lithium titanate ($Li_4Ti_5O_{12}$(LTO), available from ISHIHARA SANGYO KAISHA, LTD.) serving as a negative-electrode active material, acetylene black (Denka Black powder, available from Denka Company Limited) serving as a conduction auxiliary agent, styrene-butadiene rubber (TRD102A, available from JSR Corporation) serving as a binder, and carboxymethyl cellulose (DAICEL 2200, available from Daicel Corporation) serving as a thickening agent were mixed in a manner that a mass ratio of the mixture based on each of the solid contents were to be 100:7:3:1. Water was added to the resultant mixture to adjust the viscosity of the mixture to an appropriate degree, to thereby obtain a slurry.

Next, the obtained slurry was applied onto one side of an aluminium foil having a thickness of 18 μm using a doctor blade. An average applied amount after drying was 3.0 mg/cm². The resultant was cut out into a circle having a diameter of 16 mm to thereby produce a negative electrode.

<Non-Aqueous Electrolyte>

As a non-aqueous electrolyte, a 2 mol/L $LiPF_6$ dimethyl carbonate (DMC):ethylene carbonate (EC):fluoroethylene carbonate (FEC)=(96:2:2(wt/wt %)) mixed solution (available from KISHIDA CHEMICAL Co., Ltd.) was used.

<Production of Electricity-Storage Element>

After vacuum drying the positive electrode, the negative electrode, and the separator identical to the separator of Example 1 for 4 hours at 150° C., a 2032 coin cell as an electricity-storage element was assembled in a dry argon glove box.

In the coin cell, 400 μL of the non-aqueous electrolyte was injected to produce an electricity-storage element.

A charge-discharge test was performed on the produced electricity-storage element in the following manner.

<Charge-Discharge Test>

A reference current value was set to 0.5 mA, and the electricity-storage element was charged to the charge termination voltage of 3.7 V. After the first charge, the electricity-storage element was discharged to 1.5 V (because operating potential of lithium titanate was 1.5 V (vs $Li/Li^+$)). A pause of 5 minutes was provided between the charge and the discharge, and between the discharge and charge. This charge-discharge cycle was repeatedly performed 10 times. Thereafter, the current value of only charge was set to 5 times the reference current value (2.5 mA) to perform the charge, and discharge was performed with the reference current value of 0.5 mA. Moreover, all of charges were performed with constant current and cut-off voltage of 3.7 V and all of discharges were performed with constant current and cut-off voltage of 1.5 V, and a pause of 5 minutes was provided between the discharge and the charge. The charge was repeated until the capacity was reduced by 20% or greater relative to the discharge capacity of the first cycle when the current value was set 5 times the reference current value.

The discharge capacity at the 10th cycle with the reference current value of 2 mA, the discharge capacity at the first cycle when charged with 5 times the reference current value, and the number of cycles when the discharge capacity retention rate became 80% or less relative to 100% of the discharge capacity at the first cycle when charged with 5 times the reference current value are presented in Table 5.

Example 11

<Production of Electricity-Storage Element>

A positive electrode and an electricity-storage element were produced and an evaluation was performed in the same manner as in Example 10, except that, as a positive-electrode active material, the carbon powder which had been surface-modified with the fluorocompound identical to the carbon powder of Example 7 was used. The results are presented in Table 5.

Comparative Example 6

<Production of Electricity-Storage Element>

A positive electrode and an electricity-storage element were produced and an evaluation was performed in the same manner as in Example 10, except that, as a positive-electrode active material, a carbon powder (KS-6, available from TIMCAL) that was not surface-modified with a fluorocompound was used. The results are presented in Table 5.

TABLE 5

| | Presence of fluorine-modification of positive-electrode active material | Fluorine element amount in surface of positive-electrode active material (at %) | Discharge capacity of 10th cycle (mAh/g) | Discharge capacity of 11th cycle (mAh/g) | Cycle life (number of cycles) |
|---|---|---|---|---|---|
| Ex. 10 | Present | 3.29 | 78.6 | 68.8 | 759 |
| Ex. 11 | Present | 5.03 | 80.9 | 70.2 | 611 |
| Comp. Ex. 6 | Not present | — | 78.4 | 68.8 | 510 |

From the results of Table 5, even when lithium titanate (LTO) was used as the negative-electrode active material, an improvement of the cycle life was confirmed without reducing the discharge capacity in Examples 10 and 11 where the carbon powder surface-modified with the fluorocompound was used as the positive-electrode active material, compared to Comparative Example 6 where the carbon powder surface of which was unmodified with a fluorocompound was used as the positive-electrode active material.

Example 12

<Surface Modification of Positive-Electrode Active Material With Fluorine>

A carbon powder surface-modified with a fluorocompound was obtained in the same manner as in Example 1, except that, as a positive-electrode active material, porous carbon having pores of a three-dimensional network structure (CNOVEL, available from Toyo Tanso Co., Ltd.).

A BET specific surface area of the porous carbon was 1,730 m²/g and a pore volume of the porous carbon was 2.27 mL/g.

The BET specific surface area was measured by gas adsorption.

The pore volume was measured by the BJH (Barrett, Joyner, Hallender) method according to gas adsorption.

The obtained carbon powder was analyzed by X-ray photoelectron spectroscopy in the same manner as in Example 1. As a result, the fluorine atom was confirmed at 688 eV and an amount of the fluorine element was 3.86 at %.

<Production of Positive Electrode>

As a positive-electrode active material, the carbon powder surface-modified with the fluorocompound of Example 12 was used. The positive-electrode active material, acetylene black (Denka Black powder, available from Denka Company Limited) serving as a conduction auxiliary agent, an acrylate-based latex (TRD202A, available from JSR Corporation) serving as a binder, and carboxymethyl cellulose (DAICEL 1270, available from Daicel Corporation) serving as a thickening agent were mixed in a manner that a mass ratio of the mixture based on each of the solid contents were to be 100:7.5:3.0:7.6. Water was added to the resultant mixture to adjust the viscosity of the mixture to an appropriate degree, to thereby obtain a slurry. Next, the obtained slurry was applied onto one side of an aluminium foil having a thickness of 20 μm using a doctor blade, followed by drying the applied slurry to produce an electrode. Thereafter, the resultant was cut out into a circle having a diameter of 16 mm to thereby produce a positive electrode.

An average applied amount of the positive-electrode active material within the electrode film after drying was 2.7 mg/cm$^2$.

<Production of Negative Electrode>

A lithium metal foil having a diameter of 16 mm was used for a negative electrode.

<Non-Aqueous Electrolyte>

As a non-aqueous electrolyte, a 2 mol/L LiPF$_6$ dimethyl carbonate (DMC):ethylene carbonate (EC):fluoroethylene carbonate (FEC)=(96:2:2 (wt/wt %)) mixed solution (available from KISHIDA CHEMICAL Co., Ltd.) was used.

<Production of Electricity-Storage Element>

After vacuum drying the positive electrode, the negative electrode, and the separator identical to the separator of Example 1 for 4 hours at 150° C., a 2032 coin cell as an electricity-storage element was assembled in a dry argon glove box.

In the coin cell, 400 μL of the non-aqueous electrolyte was injected to produce an electricity-storage element.

A charge-discharge test was performed on the produced electricity-storage element in the following manner.

<Charge-Discharge Test>

The electricity-storage element was held in a thermostat chamber of 40° C., and a charge-discharge test was performed by means of an automatic battery cell evaluator (1024B-7V0.1A-4, available from Electro Field Co., Ltd.).

A reference current value was set to 0.5 mA and charge and discharge were performed with a current value (2.5 mA) that was 5 times the reference current value. Moreover, all of charges were performed with cut-off voltage of 4.5 V, all of discharges were performed with cut-off voltage of 1.5 V, and a pause of 5 minutes was provided between the charge and the discharge and between the discharge and the charge.

The cycle of the charge and the discharge was repeated until the discharge capacity became 100 mAh/g or less. However, the upper limit of the number of measuring cycles was set to 2,000 cycles. The results are presented in FIG. 5 and Table 6.

Comparative Example 7

<Production of Electricity-Storage Element>

A positive electrode and an electricity-storage element were produced and an evaluation was performed in the same manner as in Example 12, except that, as a positive-electrode active material, porous carbon (CNOVEL, available from Toyo Tanso Co., Ltd.) having pores of a three-dimensional network structure, where a surface of the porous carbon was unmodified with a fluorocompound, was used. The results are presented in FIG. 5 and Table 6.

The BET specific surface area of the porous carbon was 1,730 m$^2$/g and the pore volume of the porous carbon was 2.27 mL/g.

TABLE 6

|  | Presence of fluorine-modification of positive-electrode active material | Fluorine element amount in surface of positive-electrode active material (at %) | Discharge capacity of 100th cycle (mAh/g) | Cycle life (number of cycles) |
| --- | --- | --- | --- | --- |
| Ex. 12 | Present | 3.86 | 117 | 2,000 |
| Comp. Ex. 7 | Not present | — | 134 | 636 |

Figure 5:
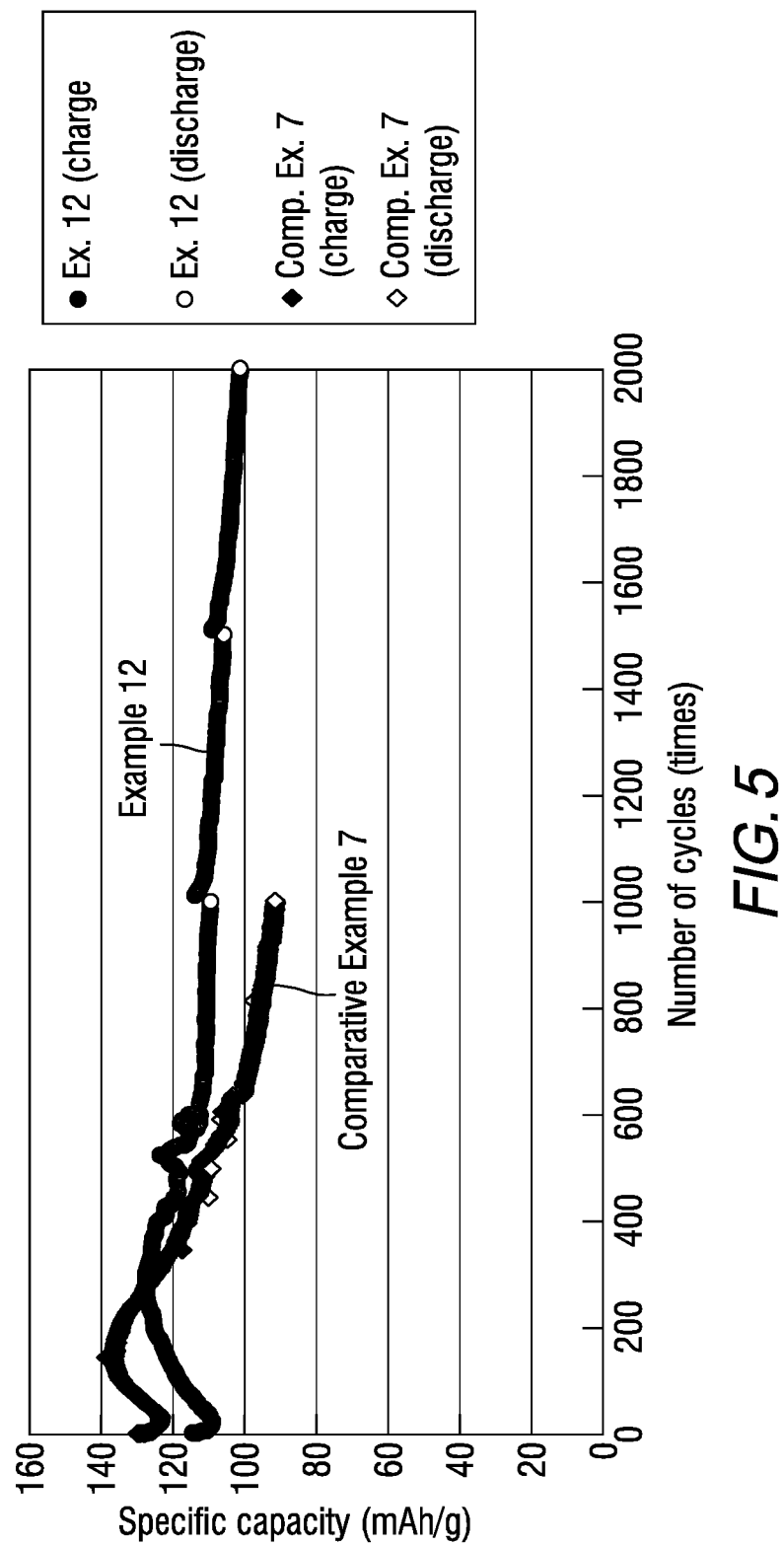
FIG. 5 is a graph depicting transitions of charge-discharge capacities of Example 12 and Comparative Example 7 over repetitive charges and discharges.

It was confirmed from the results of FIG. 5 and Table 6 that, a significant improvement in the cycle life was observed in Example 12 where the carbon powder surface-modified with the fluorocompound was used even when the porous carbon having pores of a three-dimensional network structure was used as the positive-electrode active material, compared to Comparative Example 7 where the carbon powder surface of which was unmodified with a fluorocompound was used as the positive-electrode active material.

Moreover, the discharge capacity at the 100th cycle was low in Example 12 where the carbon powder was surface-modified with the fluorocompound, compared to Comparative Example 7. It was assumed that the reduction in the discharge capacity was caused because an initial reaction with the electrolyte was suppressed and stable charges and discharges were performed.

It was found from the results above that a non-aqueous electrolyte electricity-storage element having a high capacity, excellent cycle properties, and excellent high electric-current discharge properties was able to be provided with a non-aqueous electrolyte electricity-storage element using a type of an electrode in which anions are accumulated was used as a positive electrode, when a surface of a carbonaceous material that was a positive-electrode active material included fluorine, preferably the carbonaceous material included carbon surface-modified with fluorine or a fluoro-compound.

For example, embodiments of the present disclosure are as follows.

<1> A non-aqueous electrolyte electricity-storage element including:
  a positive electrode including a positive-electrode active material capable of inserting and releasing anions;
  a negative electrode including a negative-electrode active material; and
  a non-aqueous electrolyte,
  wherein the positive-electrode active material is formed of a carbonaceous material, and a surface of the carbonaceous material includes fluorine.

<2> The non-aqueous electrolyte electricity-storage element according to <1>,
wherein the carbonaceous material includes carbon a surface of which is modified with fluorine or a fluorocompound.
<3> The non-aqueous electrolyte electricity-storage element according to <1> or <2>,
wherein an amount of a fluorine element in the surface of the carbonaceous material is 0.1 at % or greater but 20 at % or less as measured by X-ray photoelectron spectroscopy.
<4> The non-aqueous electrolyte electricity-storage element according to any one of <1> to <3>,
wherein an amount of a fluorine element in the surface of the carbonaceous material is 0.2 at % or greater but 5 at % or less as measured by X-ray photoelectron spectroscopy.
<5> The non-aqueous electrolyte electricity-storage element according to any one of <1> to <4>,
wherein the carbonaceous material is crystalline carbon.
<6> The non-aqueous electrolyte electricity-storage element according to <5>,
wherein the crystalline carbon is black lead.
<7> The non-aqueous electrolyte electricity-storage element according to any one of <1> to <4>,
wherein the carbonaceous material is porous carbon having pores having a three-dimensional network structure.
<8> The non-aqueous electrolyte electricity-storage element according to <7>,
wherein a BET specific surface area of the porous carbon is 50 m$^2$/g or greater but 2,000 m$^2$/g or less, and a pore volume of the porous carbon is 0.2 mL/g or greater but 2.3 mL/g or less.
<9> The non-aqueous electrolyte electricity-storage element according to any one of <1> to <8>,
wherein the negative electrode is a negative electrode including a negative-electrode active material capable of accumulating or releasing metal lithium, or lithium ions, or both.
<10> The non-aqueous electrolyte electricity-storage element according to any one of <1> to <9>,
wherein the negative-electrode active material is a carbonaceous material or lithium titanate.
<11> The non-aqueous electrolyte electricity-storage element according to any one of <1> to <10>,
wherein the non-aqueous electrolyte is prepared by dissolving a lithium salt in a non-aqueous solvent.
<12> The non-aqueous electrolyte electricity-storage element according to <11>,
wherein the non-aqueous solvent is at least one selected from the group consisting of dimethyl carbonate (DMC), ethylene carbonate (EC), and fluoroethylene carbonate (FEC).
<13> The non-aqueous electrolyte electricity-storage element according to <11> or <12>,
wherein the lithium salt is LiPF$_6$.
<14> The non-aqueous electrolyte electricity-storage element according to any one of <11> to <13>,
wherein a concentration of the lithium salt in the non-aqueous solvent is 2 mol/L or greater but 4 mol/L or less.
<15> The non-aqueous electrolyte electricity-storage element according to any one of <1> to <14>,
wherein the fluorocompound is at least one selected from the group consisting of lower fluorohydrocarbon, hydrofluoric acid, tetrafluoroboric acid, and hexafluorophosphoric acid.
<16> The non-aqueous electrolyte electricity-storage element according to any one of <1> to <15>, further including a separator between the positive electrode and the negative electrode.
<17> The non-aqueous electrolyte electricity-storage element according to any one of <1> to <16>,
wherein a material of a collector of the positive electrode is stainless steel or aluminium.
<18> The non-aqueous electrolyte electricity-storage element according to any one of <1> to <17>,
wherein a material of a collector of the negative electrode is stainless steel or aluminium.

The non-aqueous electrolyte electricity-storage element as defined in any one of <1> to <18> solves the above-described various problems existing in the art, and achieves the following object. Specifically, the non-aqueous electrolyte electricity-storage element has an object to provide a non-aqueous electrolyte electricity-storage element having a high capacity, excellent cycle properties, and excellent high electric-current discharge properties.

What is claimed is:
1. A non-aqueous electrolyte electricity-storage element comprising:
a positive electrode comprising a positive-electrode active material capable of inserting and releasing anions;
a negative electrode comprising a negative-electrode active material; and
a non-aqueous electrolyte,
wherein the positive-electrode active material comprises a carbonaceous material, wherein the carbonaceous material comprises carbon surface-modified with fluorine or a fluorocompound,
wherein the carbonaceous material is porous carbon having communicating pores having a three-dimensional network structure, where the pores communicate with each other, and
wherein
the non-aqueous electrolyte electricity-storage element is a dual intercalation non-aqueous electrolyte electricity-storage element where at a time of charging, anions in the non-aqueous electrolyte are inserted in the positive electrode and cations in the non-aqueous electrolyte are inserted in the negative electrode, and at the time of discharging the anions inserted in the positive electrode and the cations inserted in the negative electrode are released into the non-aqueous electrolyte,
a diameter of the pores is from 2 to 50 nm,
a BET specific surface area of the porous carbon is from 50 m$^2$/g to 2,000 m$^2$/g,
a pore volume of the porous carbon is from 0.2 mL/g to 2.3 mL/g.
2. The non-aqueous electrolyte electricity-storage element of claim 1, wherein the dual intercalation non-aqueous electrolyte electricity-storage element is a dual carbon electricity-storage element.
3. The non-aqueous electrolyte electricity-storage element according to claim 1, wherein the negative electrode is a negative electrode comprising a negative-electrode active material capable of accumulating or releasing metal lithium, or lithium ions, or both.

4. The non-aqueous electrolyte electricity-storage element according to claim 1, wherein the negative-electrode active material is a second carbonaceous material or lithium titanate.

5. The non-aqueous electrolyte electricity-storage element according to claim 1, wherein an amount of a fluorine element in the surface of the carbonaceous material is from 0.1 at % to 20 at % as measured by X-ray photoelectron spectroscopy.

6. The non-aqueous electrolyte electricity-storage element according to claim 1, wherein an amount of a fluorine element in the surface of the carbonaceous material is from 0.2 at % to 5 at % as measured by X-ray photoelectron spectroscopy.

7. The non-aqueous electrolyte electricity-storage element according to claim 1, wherein the carbonaceous material is crystalline carbon.

8. The non-aqueous electrolyte electricity-storage element according to claim 7, wherein the crystalline carbon is black lead.

9. The non-aqueous electrolyte electricity-storage element according to claim 1, wherein the non-aqueous electrolyte is prepared by dissolving a lithium salt in a non-aqueous solvent.

10. The non-aqueous electrolyte electricity-storage element according to claim 9, wherein the non-aqueous solvent is at least one selected from the group consisting of dimethyl carbonate (DMC), ethylene carbonate (EC), and fluoroethylene carbonate (FEC).

11. The non-aqueous electrolyte electricity-storage element according to claim 9, wherein the lithium salt is $LiPF_6$.

12. The non-aqueous electrolyte electricity-storage element according to claim 9, wherein a concentration of the lithium salt in the non-aqueous solvent is from 2 mol/L to 4 mol/L.

* * * * *